No. 833,144. PATENTED OCT. 9, 1906.
R. ABELL.
SPEED AND DISTANCE INDICATING DEVICE.
APPLICATION FILED NOV. 13, 1905.
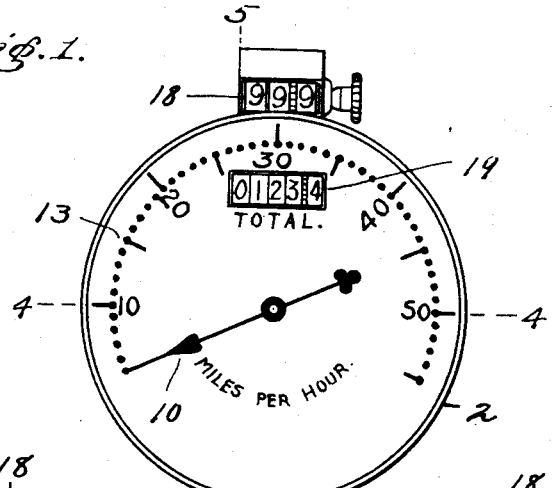
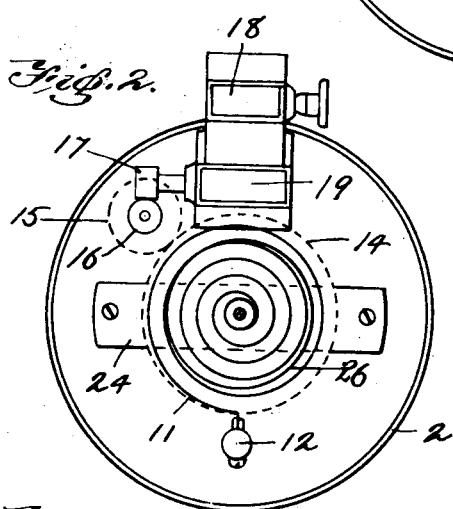 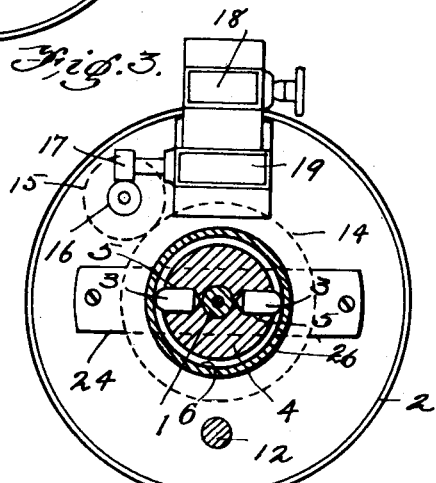
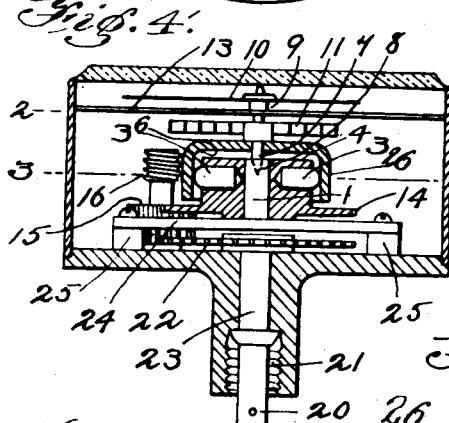 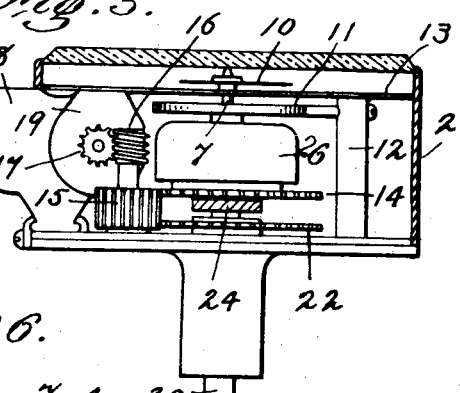
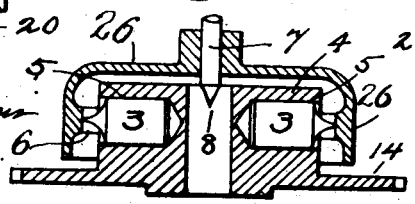
Witnesses:
Oliver P. Schwannau
Arthur G. Lewis
Inventor:
Rollin Abell
by his atty
Everett E. Kent

UNITED STATES PATENT OFFICE.

ROLLIN ABELL, OF BOSTON, MASSACHUSETTS, ASSIGNOR, BY DIRECT AND MESNE ASSIGNMENTS, TO ABELL SPEEDOMETER COMPANY, A CORPORATION OF MASSACHUSETTS.

SPEED AND DISTANCE INDICATING DEVICE.

No. 833,144.     Specification of Letters Patent.     Patented Oct. 9, 1906.

Application filed November 13, 1905. Serial No. 287,005.

*To all whom it may concern:*

Be it known that I, ROLLIN ABELL, a citizen of the United States, residing at Boston, in the county of Suffolk and State of Massachusetts, have invented new and useful Improvements in Speed and Distance Indicating Devices, of which the following is a specification.

This invention relates to devices for indicating the speed of rotation of a shaft at any instant.

It is among the objects of the invention to provide such a device of a simple and endurable construction, requiring no attention from the user when once adjusted, and having the other advantages incidental to the construction hereinafter described.

The objects are accomplished by the use of a weight or set of weights arranged eccentrically to rotate about an axis. The centrifugal force thus developed throws the weights outward from the axis against a circular concentric raceway. The friction of the moving weights against this raceway tends to drag the latter, and the latter is so mounted that it is free to rotate under the influence of this drag, except as it is restrained by a spring. The extent of its motion depends upon the strength of the drag, which in turn depends upon the speed of rotation, and is indicated by an indicator-hand arranged in connection with a suitable scale. A counting device to indicate total number of revolutions is conveniently combined with the speed-indicating device.

In the accompanying drawings, Figure 1 represents a plan view of a speed-indicator and revolution-counter embodying the invention. Fig. 2 is a plan view of the same with the cover removed. Fig. 3 is a plan view in section on the line 3 3 of Fig. 4. Fig. 4 is a front elevation in section on the line 4 4 of Fig. 1. Fig. 5 shows the interior in side elevation, the inclosing case being sectioned at the points indicated by 5 5 in Fig. 1. Fig. 6 shows part of a slightly different embodiment of the invention in side elevation, sectioned.

Referring to the drawings, 1 represents a stud or shaft set within a casing 2, about the axis of which stud the weights 3 are disposed and about which they are adapted to rotate. The weights may be supported in any suitable manner. The particular supporting device shown in the drawings is a thick disk 4, journaled upon the stud and having holes 5 bored radially in its periphery, in which the weights rest and are free to slide in or out from the center. Said weights may be of any convenient form which permits them to move or exert pressure easily in a radial direction and compels sliding contact, as distinguished from rolling contact, with the raceway 6. The latter is arranged in a circular position surrounding the axis of rotation concentrically, so that when the weights are thrown outward by centrifugal force they encounter and rub against the raceway at a uniform distance from the axis of rotation. The raceway may be supported in this position by any suitable means. The construction herein shown for supporting this raceway consists of a cup 26, pivoted in the casing and having cylindrical walls, the inside of which constitutes the raceway. The cup is mounted fast on a pintle 7, which is supported on the central stud 1 at 8 and is journaled in the casing at 9 concentrically with the axis of rotation of the weights 3. A pointer 10 is also mounted on the pintle. Rotation of the pintle, cup, and pointer is limited by a spring 11, one end of which is fast to the pintle and the other end of which is anchored to a post 12. A scale 13 is provided to aid in reading the movements of the needle 10.

The disk 4 is preferably made in such form and size as to substantially fill the cup, thus excluding air and the resulting air-currents therefrom when the parts are rotating. The raceway 6 may be flush with the inner walls of the cup 26, as shown in Figs. 3 and 4. In another form it is set out a little from those walls, as shown in Fig. 6. The weights are preferably pointed at their outer ends to reduce their area of contact with the raceway to a minimum. One form is shown in Fig. 4, in which the ends are rounded convexly. Another form is shown in Fig. 6, in which they are brought to a sharper point. The points of the weights and the raceway are preferably made of hardened steel to reduce wear. One or more weights may be employed. It is preferred to arrange the weights and the disk so that the parts will rotate evenly and in balance. The weights should fit easily in their holes, so that a very slight force will move them outward into contact with their raceway. A suitable way is to make the body of the weights cylindrical, and this has the added advantage of preventing the friction of the raceway from causing the weights to rotate about their individual axes parallel with the main axis of rotation, as might be the case if the weights were in the form of balls or rollers, it being desirable to prevent such secondary rotation.

The disk 4 bears a gear 14, which meshes with and is driven by a gear 15, which in turn is driven by a gear 22 on a shaft 23, journaled in the casing 2. Said shaft 23 is adapted to be driven by a flexible shafting connected with the shaft or rotating part whose speed is to be measured, and for this connection contains a drill-hole 20, and the casing adjacent has an internally-threaded screw 21 to receive the protective covering of such flexible shafting. The stud 1 is conveniently supported free and clear of this gearing by means of a bridge 24, set on posts 25, projecting from the base of the casing 2. On the shaft with the gear 15 is a worm 16, which meshes with the driving-gear 17 of a revolution-counting device 18 19, which may be of any ordinary or suitable type and need not be further described here. By adjusting the gearing of the revolution-counter according to the diameter of the wheel of a carriage or automobile-car the counter may be made to indicate miles per hour traveled in the manner well known. Likewise it is evident that any desired marking may be placed upon the scale 13, and the same may be calibrated and marked to indicate the speed of the shaft 23 in revolutions per minute or per second, or, if the latter be applied to an automobile-car, the speed of the car in miles per hour. In the drawings a form of the device is shown having a scale of this sort, and the revolution-counter has two portions, the upper one, 18, representing miles traveled in the particular trip and the lower one, 19, showing the total miles traveled.

The operation of the device is as follows: When the weights are revolved about the axis of the stud 1, centrifugal force throws them outward till they encounter and rub against the raceway 6. The latter is stationary, except as the spring 11 permits it to turn a little. With higher speeds the pressure of the weights against the raceway is greater, their drag or friction thereon is greater, the spring yields a little, and thus the raceway and its supporting-cup and pintle 7 are turned commensurately until the increased tension is balanced by the spring. The amount of this turning is indicated by the hand 10. As the position of the hand depends upon the drag on the raceway at any instant and as the amount of the drag at that instant depends upon the coincident speed of rotation of the weights 3 and shaft 23, it follows that the pointer 10 indicates the speed at the particular instant irrespective of the speed at any previous time. The revolution-counter, driven from the same shaft, is meanwhile registering the total distance traveled. Thus the instrument shows at a glance both the distance traveled and the rate at any particular instant.

I claim—

1. In a speed-indicating device, the combination of a circular raceway; a weight revoluble within it and bearing against it centrifugally; means to connect the weight with the body whose speed is to be indicated; and means to oppose the resulting rotation of the raceway elastically.

2. In a speed-indicating device, the combination of a circular raceway; a weight revoluble within it and bearing against it centrifugally; means to connect the weight with the body whose speed is to be indicated; means to oppose the resulting rotation of the raceway elastically; and means to measure the extent of such rotation.

3. In a speed-indicating device, the combination of a circular raceway; a weight revoluble within it and bearing against it centrifugally; means to connect the weight with the body whose speed is to be indicated; means to oppose the resulting rotation of the raceway elastically; and a scale and an indicator arranged to measure the extent of such rotation.

4. In a speed-indicating device, in combination, a thick disk mounted rotatably, and having one or more radial holes; one or more weights arranged to slide easily within said holes; a raceway circumjacent the path of rotation of said holes arranged for contact with said weights; and means to oppose the resulting rotation of the raceway elastically.

5. In a speed-indicating device, in combination, a thick disk mounted rotatably, and having one or more radial holes; one or more weights arranged to slide easily within said holes; a raceway circumjacent the path of rotation of said holes arranged for contact with said weights; means to oppose the resulting rotation of the raceway elastically; said weights being arranged symmetrically with respect to the axis or rotation.

6. In a speed-indicating device, the combination of a circular raceway; a weight revoluble within it and bearing against it centrifugally; means to connect the weight with the body whose speed is to be indicated; and means to oppose the resulting rotation of the raceway elastically; said weight being shaped to a point for contact with the raceway.

7. In a speed-indicating device, in combination, a thick disk mounted rotatably, and having one or more radial holes; one or more weights arranged to slide easily within said holes; a raceway circumjacent the path of rotation of said holes arranged for contact with said weights; and means to oppose the resulting rotation of the raceway elastically; each weight being cylindrical in form, with its outer end shaped to a point for contact with the raceway.

8. In a speed-indicating device, in combination, a thick disk mounted rotatably; a cup concentric therewith closely surrounding the disk; radial holes in the disk; weights sliding easily therein, arranged to bear against the cup centrifugally; and means to oppose the resulting rotation of the cup elastically.

9. In a speed-indicating device, a body revolved by the body whose speed is to be indicated, and arranged in centrifugal sliding contact with a confining solid body, in combination with said confining-body, arranged to prevent centrifugal movement of the revolving body when in operation, and means to indicate the resulting traction of the revolving body upon the confining-body.

In testimony whereof I affix my signature in presence of two subscribing witnesses.

ROLLIN ABELL.

Witnesses:
OLIVER P. SCHOONMAKER,
ARTHUR G. LEWIS.